United States Patent [19]

Abraham et al.

[11] Patent Number: 4,486,784

[45] Date of Patent: Dec. 4, 1984

[54] IMAGE COMPRESSION SYSTEMS

[75] Inventors: Dennis G. Abraham, Concord; Thomas W. Gallman, Charlotte, both of N.C.

[73] Assignee: International Business Machines Corporation, Armonk, N.Y.

[21] Appl. No.: 453,021

[22] Filed: Dec. 27, 1982

[51] Int. Cl.³ .......................... H04N 1/40; H04N 7/13
[52] U.S. Cl. ..................................... 358/261; 358/260; 340/347 DD
[58] Field of Search ............................... 358/261, 260; 340/347 DD

[56] References Cited

U.S. PATENT DOCUMENTS

| | | | |
|---|---|---|---|
| 3,830,965 | 8/1974 | Beaudette | 358/261 |
| 3,927,251 | 12/1975 | White | 358/261 |
| 4,040,093 | 8/1977 | Nakagome et al. | 358/261 |
| 4,245,257 | 1/1981 | Yamazaki et al. | 358/260 |

Primary Examiner—Howard W. Britton
Attorney, Agent, or Firm—E. Ronald Coffman

[57] ABSTRACT

A system for compressing image data, when input in the form of run length coded sequential lines of image data, encodes variable length segments of the current to-be-coded line two dimensionally in terms of the detected relationship between the constants of five registers. The run length code words of the current line and the immediately previous reference line are accessed sequentially and selectively from respective FIFO buffers under the control of switching logic which also establishes a pattern of connections, unique to the generated code representing the immediately previous current line segment, coupling the outputs of the registers and the buffers to the inputs of the registers through adders to establish the next set of five values in terms of which segment coding takes place. One dimensional coding can be accommodated.

7 Claims, 10 Drawing Figures

| MODE | ELEMENTS TO BE CODED | | NOTATION | CODEWORD |
|---|---|---|---|---|
| PASS | b1, b2 | | P | 0001 |
| HORIZONTAL | a0a1, a1a2 | | H | 001+M(a0a1)+M(a1a2) |
| VERTICAL | a1 JUST UNDER b1 | a1 b1 = 0 | V(0) | 1 |
| | a1 TO THE RIGHT OF b1 | a1 b1 = 1 | VR(1) | 011 |
| | | a1 b1 = 2 | VR(2) | 000011 |
| | | a1 b1 = 3 | VR(3) | 0000011 |
| | a1 TO THE LEFT OF b1 | a1 b1 = 1 | VL(1) | 010 |
| | | a1 b1 = 2 | VL(2) | 000010 |
| | | a1 b1 = 3 | VL(3) | 0000010 |

| MODE | ELEMENTS TO BE CODED | | NOTATION | CODEWORD |
|---|---|---|---|---|
| PASS | b1, b2 | | P | 0001 |
| HORIZONTAL | a0a1, a1a2 | | H | 001+M(a0a1)+M(a1a2) |
| VERTICAL | a1 JUST UNDER b1 | a1b1 = 0 | V(0) | 1 |
| | a1 TO THE RIGHT OF b1 | a1b1 = 1 | VR(1) | 011 |
| | | a1b1 = 2 | VR(2) | 000011 |
| | | a1b1 = 3 | VR(3) | 0000011 |
| | a1 TO THE LEFT OF b1 | a1b1 = 1 | VL(1) | 010 |
| | | a1b1 = 2 | VL(2) | 000010 |
| | | a1b1 = 3 | VL(3) | 0000010 |

FIG. 10

IMAGE COMPRESSION SYSTEMS

This invention relates to a system for compression coding image data consisting of an array of binary picture elements.

BACKGROUND

It is common practice to transform an array of black/white picture elements of a facsimile image into a more compact or compressed form to reduce the number of binary bits that must be stored or transmitted. Many compression techniques operate to substitute code words for linear segments of binary picture elements. One common technique, known as run length coding, encodes successive alternate colored line segments by a code word indicating the number of picture elements of one color in each segment. A more complex technique supplements the run length coding, where efficient, by encoding some line segments by reference to color transitions occurring on a preceding or reference line.

PRIOR ART

Prior art compression systems normally receive uncoded picture elements as input and operate bit-by-bit to accumulate the information necessary to encode the successive segments. This arrangement requires the storage and processing of a large number of bits, particularly where a reference line of image data is used in the coding technique. It is known to convert the un-coded picture elements into run lengths to minimize storage and processing requirements of the compression technique, itself. Such known techniques do not have the capability of handling the full range of encoding situations required by preferred compression code systems.

DESCRIPTION OF THE INVENTION

Our invention employs a set of registers which, for each coding operation, are loaded with the absolute line address of color transitions in the vicinity of the line segment being encoded. Logic circuits test various relationships of the contents of the various registers and determine which of a finite number of relationship states exist. The output code is generated as determined by the particular relationship state. The relationship state also controls the updating of the registers for coding the subsequent segment. By providing a controllable updating routine following each coding operation, our invention makes it possible to accommodate a variety of vertical reference codes. One particularly important vertical reference code is known as "pass mode". This code defines the end of a line segment as being vertically aligned with the second successive color transition on a reference line. The coded line segment does not itself terminate at a color transition.

SUMMARY OF THE PRESENT INVENTION

It is an object of the present invention to provide an image compression system which will efficiently and directly process a run length encoded representation of a binary array and is capable of compressing data in accordance with complex time dimensional compression techniques.

It is an alternative object of the present invention to provide a run length to multimode compression encoder which is efficient in its use of storage in that encoding is essentially performed in a single pass though, by definition, each line is used twice, as current and as reference.

In an embodiment of the invention discussed herein after the run length code elements of each of a pair of adjacent lines (current and reference) are processed selectively but in strictly sequential order to generate, in each encoding iteration of a set progressively encoding along the current line, the separation from the respective line origins of the change elements defining a full cycle (a white section followed by the next black section or vice versa) in the current line and the next adjacent half cycle (a black section or a white section) of the same type as the second half of the current full current line cycle following the start of the full cycle, but located in the reference line. These five values are established in registers and are processed to determine the output encoding mode which is used, in, to control the generation of full and half cycle change element separations for the next iteration by determining the switchin configuration of a logic block which interconnects the line stores and the registers so that the register contents are selectively swapped and/or incremented. Some of the register contents are also internally buffered to render the line stores sequential.

BRIEF DESCRIPTION OF THE DRAWINGS

These and other objects of the present invention will be detailed hereinafter as they apply to a preferred embodiment of the invention, described by way of example with reference to the accompanying drawings in which.

In order to describe one specific multimode compression encoder according to the invention, it will first be necessary to define one specific multimode compression code and one specific manner of run length coding for a binary array since, clearly, the details of the encoder will change if either or both of the codings change.

Figure 9:
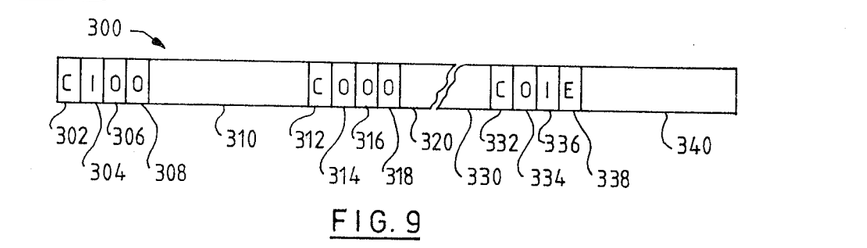
FIG. 9 illustrates the input run length code word format.
Figure 10:
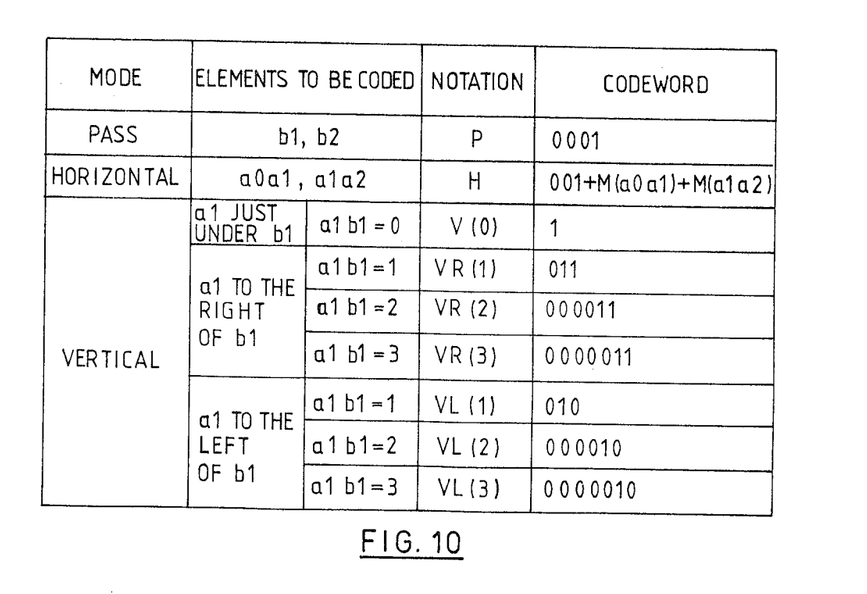
FIG. 10 is a table defining the output code and format.

RUN LENGTH CODE (FIG. 9)

The binary array is encoded line by line as a series 300 of binary run length codes. The actual code words each comprise a binary coded number 310, 320, 330, 340 representing the pixel separation between a corresponding pair of adjacent change elements, together with four additional tag bits. The state of the first tag bit 302, 312, 332 indicates the color of the run length. The state of second tag bit 304, 314, 334 indicates whether or not the code word represents the first run length of the line. The state of the fourth tag bit 308, 318, 338 indicates whether or not the code word represents the last run length of the image.

Figure 8:
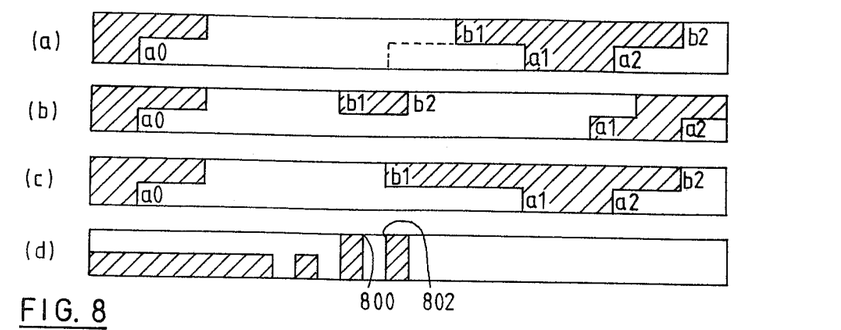
FIG. 8 illustrates the three main relational states already referred to together with a pixel pattern, which although of relational state (a) has unusual segment definition properties.

MULTIMODE COMPRESSION CODE (FIG. 8)

The multimode compression code is best defined by a set of definitions and rules, as follows:
 a0, a1 and a2 are adjacent change elements in the current line (a0 can be thought of, also, as an operating point)
 b1, b2 are adjacent change elements in the history or reference line and the direction of change at b1 is opposite to that at a0, with b2 being the next following such change element.

These five pixels define a variable sized window spanning the current and reference lines with its origin at a0. Thus a0 is to be located and thereafter the remaining four elements located with reference to a0. The five elements are examined to determine a feature for the window and hence the length of the line segment starting at a0 to be coded and the mode of coding to be used as well as the value of the coding.

If $b2 \geq a1$ and $|a1-b1| \leq 3$ (corresponding to relational state (a)) the feature determines use of a so-called vertical mode and produces an output in the form of an appropriate one of the seven code words for $-3$ to $+3$, when this feature is detected, the next a0=the old a1 so that the segment coded is old a0 to a1.

If $b2 \geq a1$ and $|a1-b1| > 3$ (corresponding to relational state (c)) the feature determines use of a so-called horizontal mode and produces an output in the form of a mode identifier prefix (001) plus the two successive values (a1−a0) and (a2−a1). When this feature is detected, the next a0=the old a2 so that the segment coded is old a0 to old a2.

If $b2 < a1$ (corresponding to relational state (b)), the feature determines use of a so called pass mode and produces solely a mode identifier (0001). When this feature is detected, the next a0=the old b2 so that the segment coded is old a0 to old b2. This means that the next a0 is not a change element, but since a1, a2 do not change, the next a0 can be treated as being a change element of the color identical to that of the old a0.

It should be noted that the window is bounded by a0 and the greater of b2; a2 (they values being specifically defined at the end of a line). Further, conceptually, after pass mode and horizontal mode, the b elements are skipped in pairs whereas, after vertical mode, odd numbers of run length elements are skipped. After horizontal mode, it is possible that several pairs of b elements may have to be skipped if old $a2 \geq$ old b2.

Further, though of minor importance, the values are themselves represented by specific codes as will become apparent subsequently.

GENERAL DISCUSSION OF ENCODER

Figure 1:
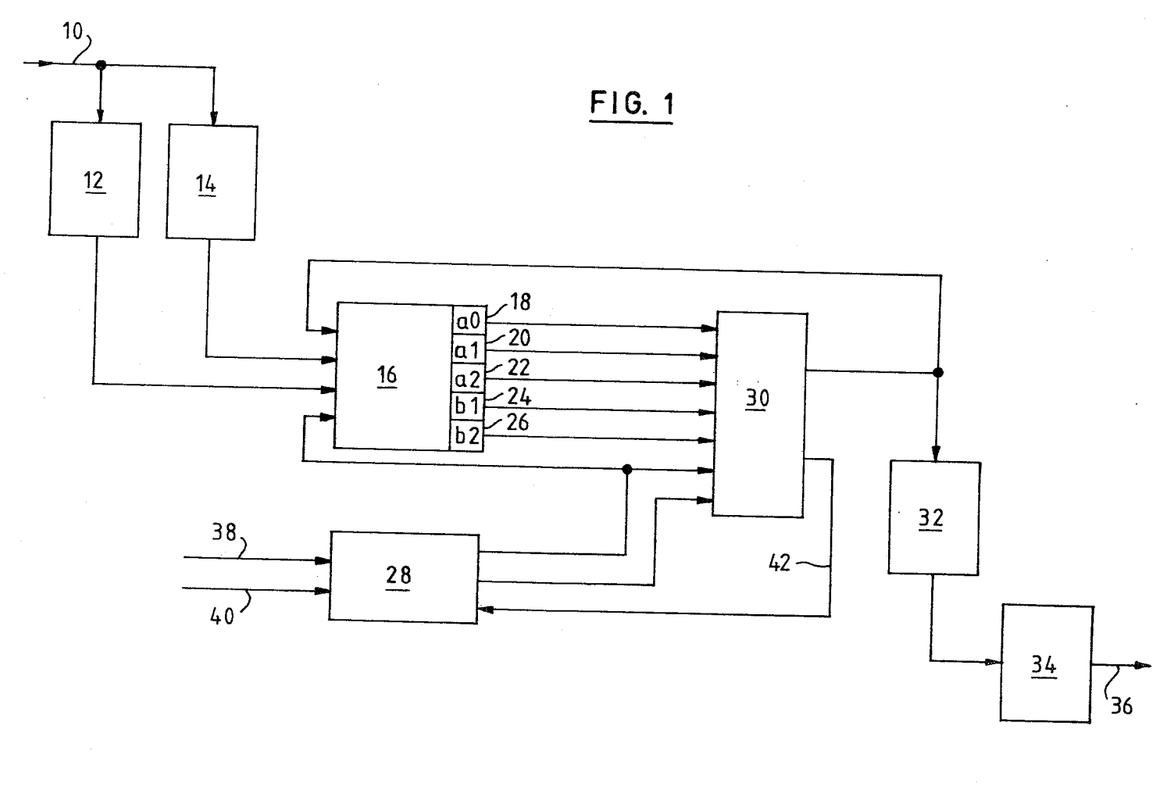
FIG. 1 is a generalized block diagram of the exemplary encoder.

The basis of the illustrated encoder is the combination of two FIFO line stores 12, 14, one for the run length codes of the reference line and the other for the run length codes of the current line both from input bus 10; five registers 18, 20, 22, 24 and 26, one for each of a0, a2, b1 and b2; feature determining logic 30, responsive to the register contents, driving output logic 34 via a FIFO buffer 32; and gating logic 16 (which includes an adder) interconnecting the line stores, the outputs of the registers and the inputs of the registers and controlled by a sequencer 28 responsive to the feature determining logic via line 42 and the values being generated. The gating logic 16 functions to load the registers with new a and b values after each feature determination in terms of their pixel separation from the line origins, assumed aligned. The feature determining logic 30 functions, basically by subtraction, generating both mode and value more or less simultaneously. The output logic 34 is merely a lookup table and line driver combination, converting the mode and value determination into the required output form on output 36. The control sequencer 28 also receives external control data on lines 38 and 40 generally indicating starts and ends of line, color and, of course, demand for encoding and whether the two dimensional coding is to be used or some other form of coding, which, in the illustrated embodiment, is a simple one dimensional modified Huffman run length code. Postulating no interference by starts of lines, ends of lines, first line and so on, the line stores will have been accessed to the extent of the a2 and b2 increment values at the time of a feature determination and the five registers will hold old a0, old a1, old a2, old b1, old b2 respectively:

If the feature determination defined pass mode, the contents of the b2 register are written into the a0 register, into b1 register after having the next reference line store increment value added to them, and, into the b2 register after having, in addition, the next but one reference line store increment value added. To write the new b1 register contents when incremented into the b2 register is exactly equivalent. The a1 and a2 registers are not changed.

If the feature determination defined vertical mode, the contents of the a1 register will be written into the a0 register, the contents of the a2 register will be written into the a1 register, and, after having the next current line store increment value added thereto, into the a2 register. Loading the b registers is not necessarily so simple as merely making new b1 equal to old b2 and new b2 equal to old b2 added to the next reference line store increment value. However, b1 is defined as being greater than a0 as well as being adjacent and of the opposite kind. Thus, if new $a0 \geq$ old b2, two successive increment values from the reference line store will need to be added to the old b2 value to obtain the new b1 value and, therefore, three values to obtain the new b2 value. This is why the sequence has to be responsive to the values being generated as well as to the mode previously determined. It can also happen that the previous old b1 is greater than a1, so that the previous old b1 becomes the new b1.

If the feature determination defined horizontal mode, the contents of the a2 register are written into the a0 register and, after respectively one and two successive increments from the current line store have been added, into the a1 and a2 registers. The contents of the b2 register, incremented, at least, by the next increment followed, if necessary by as many successive pairs of increment values from the reference line store as are required to make new b1 > new a0, are written into the b1 register and, after one more increment, into the b2 register.

It will be apparent that the start of the current line segment being encoded depends on the value loaded into the a0 register 18, which register can be thought of as an operating point register while the other registers, 20, 22, 24 and 26, can be thought of as transition point registers.

At this point, it must be pointed out that the pattern of incrementing is adopted to avoid having to retain an increment value in a line store once it has been used, to obvious advantage, but it would be possible to retain the last value of each line store accessed, until the next access, in which case, considering the b-register values and incrementing old b1 to obtain new b1, odd numbers of increments would be needed after vertical mode and even numbers of increment after horizontal mode. However, even operating in the detailed simpler manner, it is possible to encounter circumstances as already indicated in which steady progress through increment values is interrupted and, to this end, it is preferred to provide duplicate b-registers for buffering purposes as will be explained hereinafter.

Once the a and b register values are stabilized, the feature determining logic, at least conceptually, generates (b2−a1) (a1−b1) (a1−a0) and (a2−a1). If (b2−a1)<0, the other values are not required and, if the current line store retains its last two accessed values until the next access, rather than one or preferably none, there is no need to generate (a1−a0) and (a2−a1). However, it is preferred to re-generate these latter values when required and to simplify the line stores.

Since the actual value (b2−a1) is not required, merely whether or not it is negative, a single line output will suffice for this subfeature. Since (a1−b1) is only of interest when it take one of the seven values from −3 to +3, it is simplest to use this result to signal on one of seven lines thus if there is a significant signal on the (b2−a1) line, pass mode is the required output. If (b2−a1) is not significant and one (a1−b1) line is significant, one of the seven vertical mode outputs is required.

Otherwise, both values (a1−a0) and (a2−a1) are required, aggregated into a horizontal mode output.

These functions can be performed sequentially using a subtract circuit or in parallel using four subtract circuits, the resulting signals being used to access corresponding locations in stored look-up tables to produce the actual coded output.

The circumstances which render duplicate b-registers or buffers useful is illustrated in FIG. 8, part (d), which shows an area in which the reference line has three consecutive white pixels followed by adjacent black, white and black pixels, the corresponding section of the current line have white, black, white, black, white and black pixels, the first white pixel being a change element. The three code outputs for the three line segments in this area will all be in vertical mode so that the window origin a0 will advance by one pixel at a time. However, the location of b1 is the first black pixel 800 for both the first and third windows whereas it is the fourth white pixel 802 for the second window. In other words b1 returns on itself, which unless b buffers are used, requires a used reference line increment value to be retained.

DETAILED DESCRIPTION

Turning now to the detailed logic of the major sections of the specific form of the encoder discussed hereinbefore in general terms, it must be noted that there are special provisions made in the output compression code to deal with first lines, starts of lines and ends of lines, and the detailed logic must accommodate these provisions.

The first line is encoded by simple one dimensional run length encoding since there is no reference line to which to relate it. For the first line coding is assumed to begin with a white pixel. Should the first pixel be black, it is preceded by a white run length of zero.

As to the end of a line, coding continues as if there were an imaginary change pixel located just after the actual last pixel of the line. Thus for the current line, this may be a1 or a2 and, for the reference line, if not actual b1 and b2 are present, they are also presumed to be similarly located just after the end of the reference line.

Further it is convenient to consider the loading of the a and b register independently so that a control sequence is shown separately for each and may be regarded as the appropriate portions of the single general sequencer which may be sequential logic or a control table driven microprocessor. Only the function of the control sequencer is considered in detail, its structure being conventional. The line stores, result store and output logic being similarly of conventional structure and not considered in detail. Thus the detailed description concentrates on the loading of the a and b registers and the feature determination.

Figure 2:
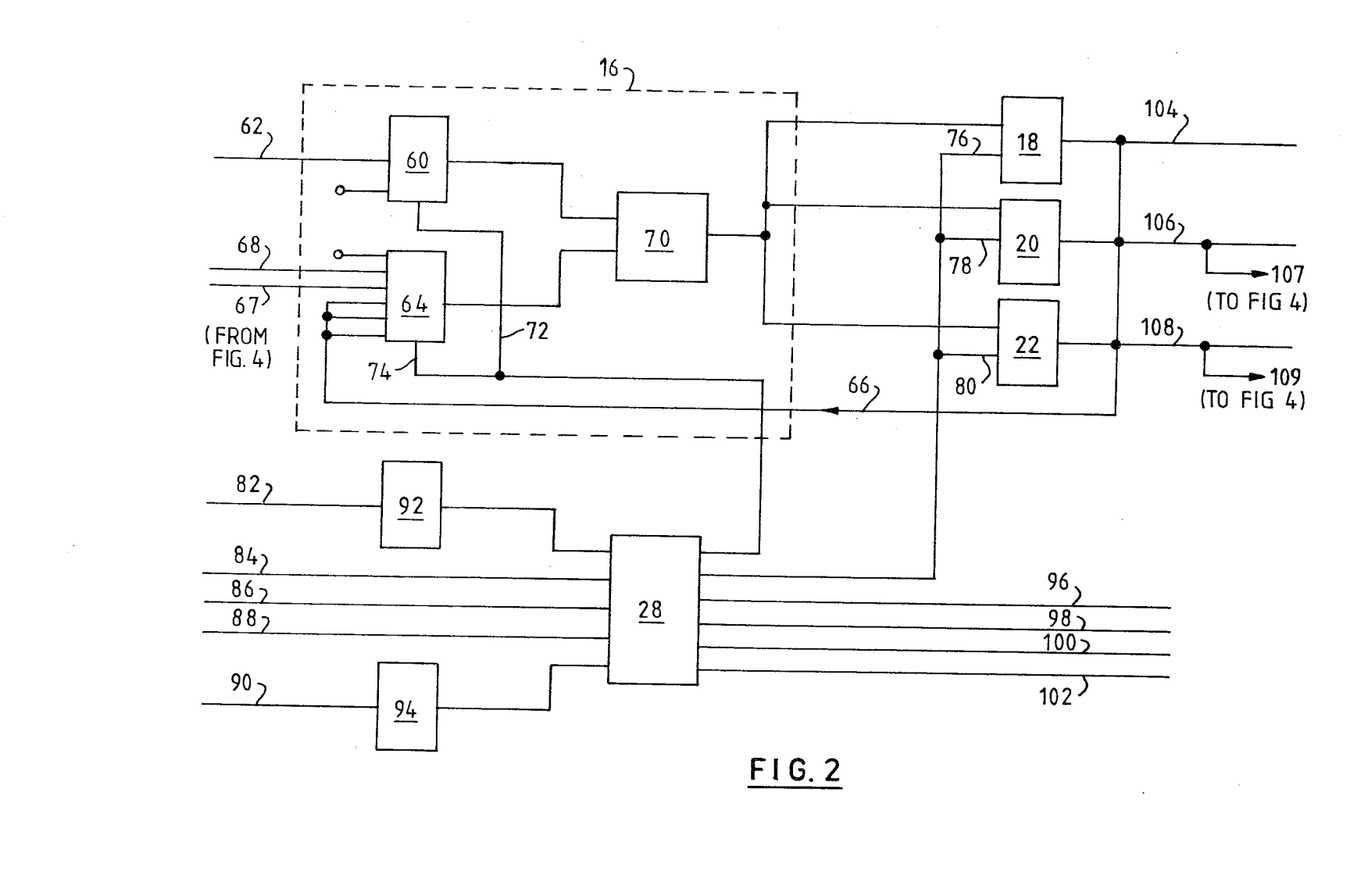
FIG. 2 is a more detailed block diagram of one section of the constant generation mechanism of the encoder.
Figure 3:
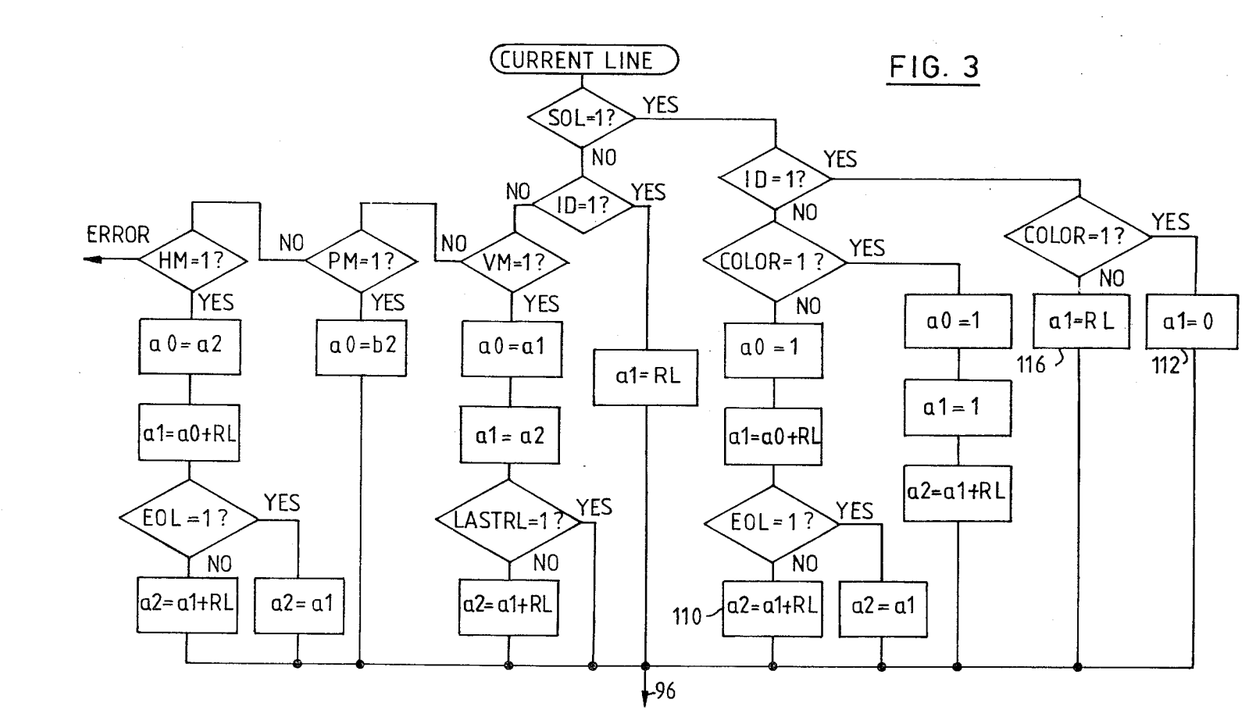
FIG. 3 is a flow chart of the operation sequences of the mechanism of FIG. 2 arranged in logical order for explanatory purposes rather than in strict relative timing order.

A—REGISTERS (FIGS. 2 & 3)

The a-registers 18, 20, 22 are loaded, under control of the control sequencer 28, by gating logic 16 comprising a gate 60 receiving an input from the current line store 4 on bus 62, a gate 64 receiving inputs from the three a-registers 18, 20, 22 on bus 66 as well as an output from the b2 register 26 on bus 67 and a value of "1" input on bus 68, the gates feeding an adder 70 coupled to the a-resisters. The gates 60 and 64 are controlled by the control sequencer via control lines 72, 74 and the a-registers are selectively settable to the adder output by signals from the control sequencer on control lines 76, 78, 80. The control sequencer receives, as control input on respective lines 82, 84, 86, 88, 90 the feature last determined by the feature determinating logic 30; the input code control markings relating to start of line, end of line, the color marking and whether or not one dimensional encoding is to be used: a feed back control signal from the feature determine logic indicating the need for a fresh loading cycle and a signal from the line store indicating that it is ready to produce a next output. Since the control sequencer needs to know, not the last determined feature but only the corresponding coding mode, line 82 includes a feature to mode decoder 92. To save the line store having to hold the signal level on line 90, a latch 94 is incorporated.

In addition to gating control outputs, the control sequencer emits control outputs to the feature determining logic 30 on lines 96, 98, 100 and to the current line store 14 on line 102. The respective information is that the constants are ready, the last run length code unit for the line has been used, the last feature of the line is being determined and that an output is required from the current line store. The a-registers 18, 20, 22 couple to the feature determining logic via connections 104, 106, 108.

The functions determined by the control sequencer to load the a-registers are shown in flow chart form in FIG. 3 which needs no further explanation save to note:

SOL=1?→is this the start of a new line?
EOL=1?→is this the end of a line?

ID=1?→is the entire line to be encoded one dimensionally?

LASTRL=1?→is this the last run length coded unit store for the line in the current line store?

COLOR=1?→is the run length color black?

VM=1?→did the last determined feature demand use of vertical mode coding?

HM=1?→did the last determined feature demand use of horizontal coding?

PM=1?→did the last determined feature demand use of pass mode coding?

The basic operation to load a register is for multiplexor gate 60 to gate a run length code unit from the current line store 14, via bus 62, or a value of "0", and for multiplexor gate 64 to gate a register value supplied through either three cable bus 66 or bus 67 or value of "1" on bus 68 or a value of "0" to the adder, the result being loaded into the register 18, 20, or 22 selected by the control sequencer by the significant one of the control lines 76, 78 or 80. Thus for example, at 110 in FIG. 3, A2=A1+RL involves gating the next current line store output and the contents of register 20 to the adder and loading the result into register 22, control line 80 being rendered significant. Although logically new A2=old A2 incremented twice, the interim result old A2 incremented once is present in register 20 at this time so that the interim result is used.

The first line to be handled is always coded one dimensionally as simply a sequence of modified Huffman run length code words of alternating color. It is assumed that the first color will be white (color=1? No!) and operation 116 merely sets a1 to the next run length accessed from the current line store 14. If the color of just run length in the current line store 14 is black (color=1? Yes!), operation 112 inserts a "first" white run length of length "0" before operation 116 processes the actual black run length. Registers a0, a2, (as well as registers b1 and b2) are not used when one dimensional coding (ID=1? Yes!) is invoked.

Figure 4:
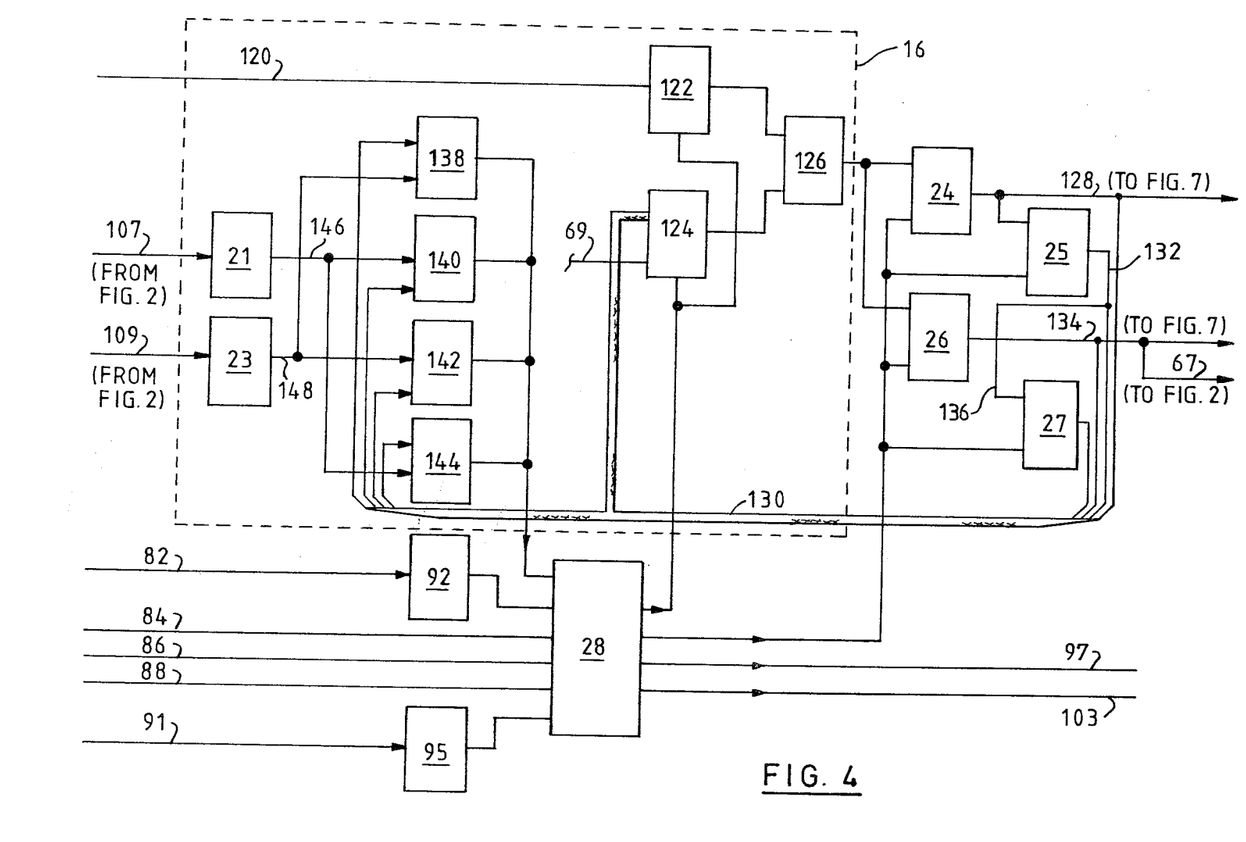
FIG. 4 is a more detailed block diagram of the other section of the constant generation mechanism of the encoder.
Figure 5:
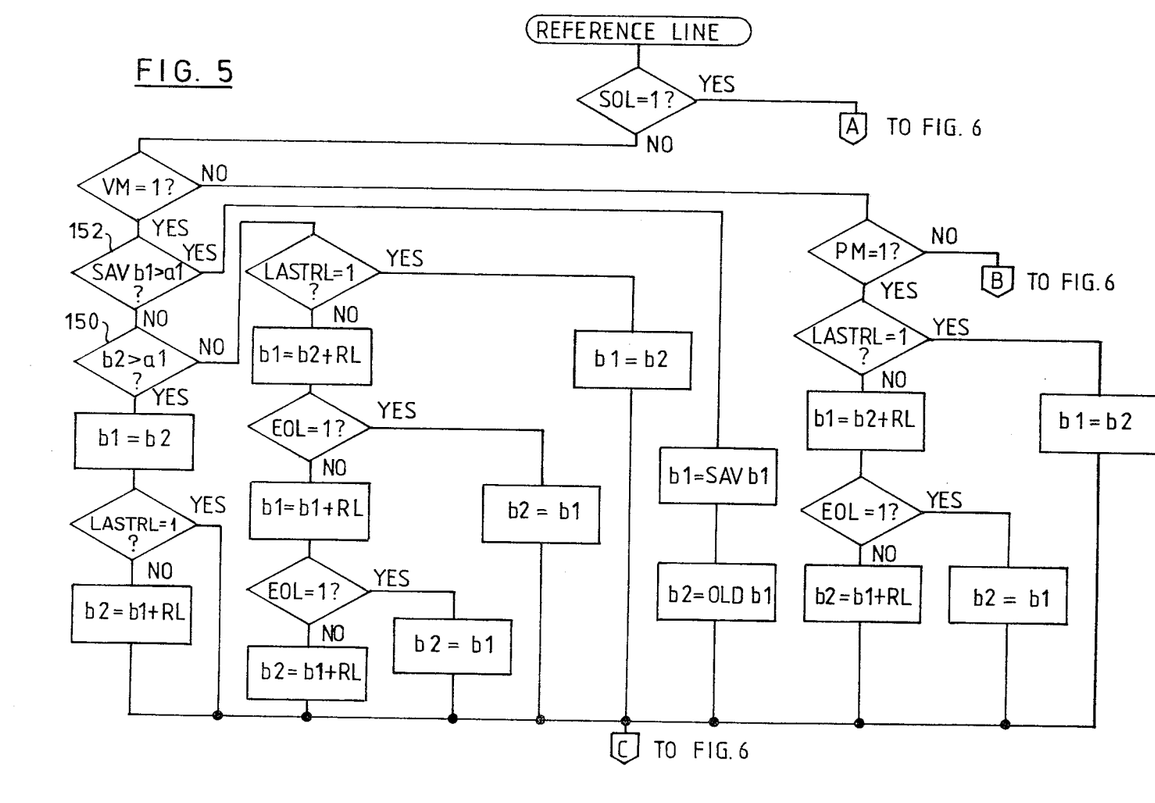
FIGS. 5 and 6 together form a flow chart of the operation sequences of the mechanism of FIG. 4 arranged in logical order for exemplary purposes rather than in strict relative timing order.
Figure 6:
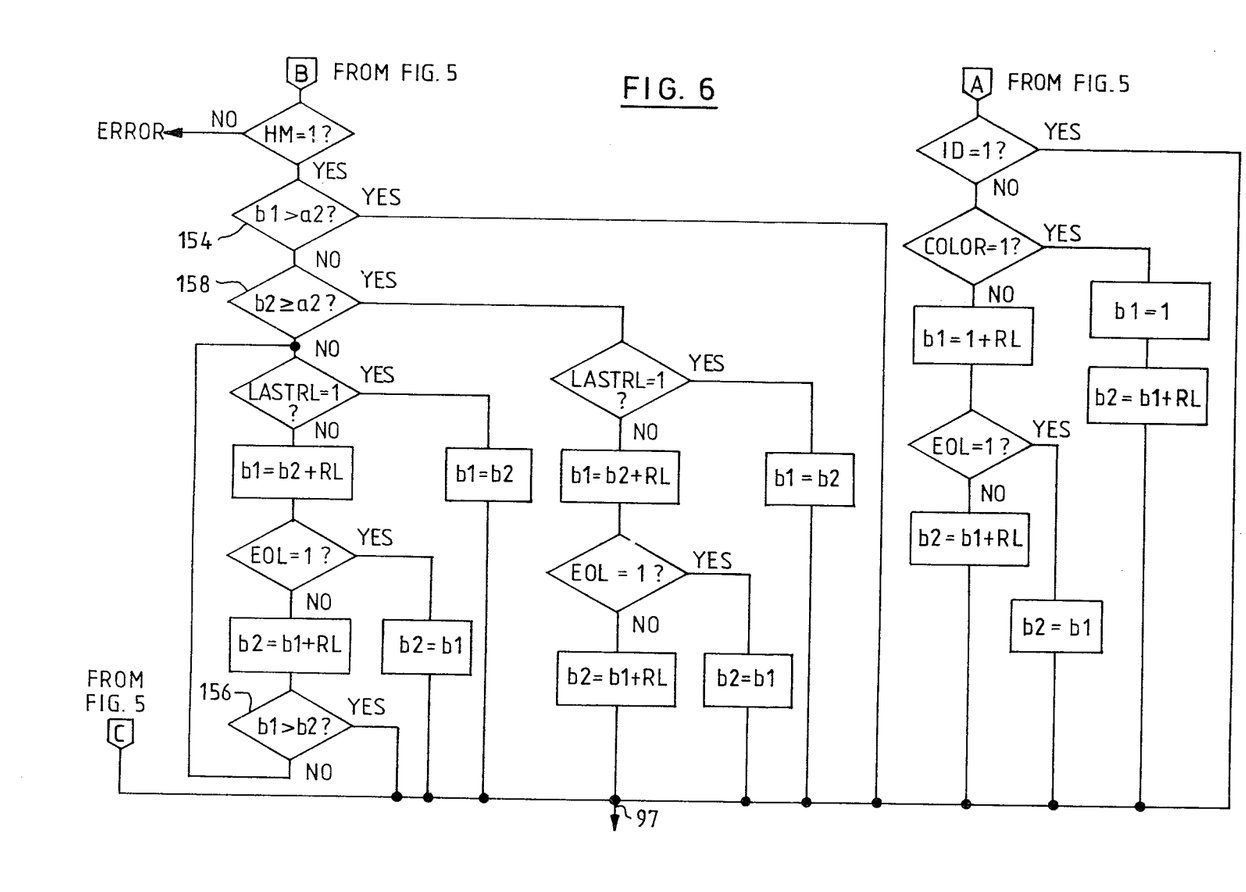

B-REGISTERS (FIGS. 4, 5 & 6)

The b-registers 24, 26 are loaded in a basically similar manner using run length code elements from the reference line store 12 supplied on bus 120 and fed back values, directly or indirectly, from registers 20, 22, 24, 26, as gated by gates 122 and 124 respectively to an adder 126 and distributed either to register 24 or to register 26. The control sequencer 28 and control elements 82, 84, 86, 88 and 92 are repeated in FIG. 4, merely to make it self sufficient. Control elements 91, 95 and 103 however, although equivalent to control elements 90, 94 and 102 of FIG. 2, relate to the reference line store 12 and not to the current line store 14 and the readiness of the constants is signalled on line 97 which is equivalent to line 96 of FIG. 2.

Four buffer registers 21, 23, 25, 27 are incorporated, respectively buffering registers 20, 22, 24 and 25 and therefore holding old a1, a2, old b1 and the next previous old b1 or SAV b1; buffer registers 21 and 23 being used to determine the sufficiency of incrementing of the b-registers in the cases of previous horizontal and vertical coding modes and buffer register 25 and 27 being used to accommodate the special case, previously pointed out in the general description, in which the b-register values required to be set to the next previous values. The output 128 of buffer register 24 passes to the feature determining logic of FIG. 7, the input of buffer register 25 passes both to buffer register 27 and to the common bus 130, the output 134 of buffer register 26 passes to the feature determining logic of FIG. 7, via bus 67 to gate 64 of FIG. 2 and to the common bus 130. The output 136 buffer register 27 passes to the common bus 130 which connects, in turn to gate 124 and to a bank of comparators 138, 140, 142, 144. The outputs 146, 148 of buffer register 21, 23 provide the other inputs to the comparators, the outputs of which supply status signals inputs to the sequencer 28. In addition there is a value of "1" input line 69 to gate 124 similar to the line 68 to gate 64 of FIG. 2. The control sequencer 28 determines the operation of register 24, 25, 26, 27 and gates 122 and 124 in the manner set out in FIGS. 5 and 6 which are self explanatory if the following points are borne in mind:

(a) There is no reference line for encoding the first line and therefor no b-values (b) The location of b1 can be both to the right and left of its last position and when moving to the right (following the scanning convention implied in this description), it will move an even number of increments following pass and horizontal mode encoding but an odd number of increments following vertical mode encoding and, after horizontal mode encoding, plural pairs of increments may be required.

(c) Certain relationships are implied in relation to the old a and b values by the mode of the previous encoding, particularly, if pass mode, old b2<old a1 and, if not, old b2≧old a1. Thus, after vertical mode encoding, b1 can move to old b2 if old b2>old a1 (one increment) otherwise it needs to move to old b2 plus two increments (three increments). But since, old b2≧old a1, only old b2≠old a1 is required as a test. FIG. 5, at 150, shows the logical test (b2>b1?) but comparator 140 only tests for equality/inequality between a1, from register 21 and b2 from register 26 via the common bus 130. The remaining comparators test for SAV b1 (from register 2 7)>a1 (from register 23) at 152 in FIG. 5 and 144 in FIG. 4; b1 (from register 24)>a2 (from register 23) at 154 and 156 in FIG. 6 and 142 in FIG. 4; and b2 (from register 26)≧a2 (from register 23) at 158 in FIG. 6 and 138 in FIG. 4.

Figure 7:
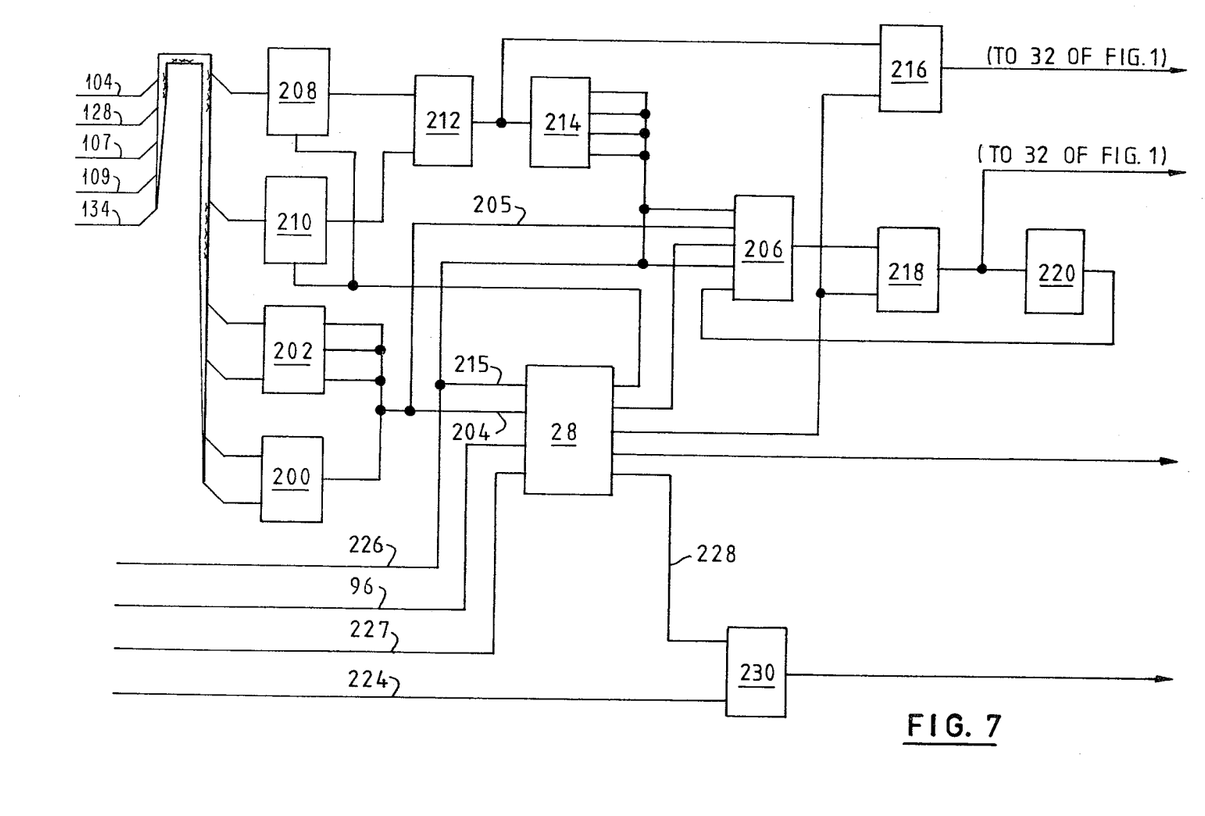
FIG. 7 is a more detailed block diagram of the feature determining logic of the encoder.

FEATURE DETERMINATION (FIG. 7)

From the setting of the a- and b-registers 18, 20, 22, 24 and 26, feature determination is completed in one or two steps, though, when horizontal mode is determined, a further two steps are required to calculate the actual values (a1−a0): (a2−a1). In the first step, and in parallel, b2 and a1 are compared at comparator 200 to detect b2<a1 and a1 and b1 are compared at comparator 202 to determine a1>b1, a1=b1 or a1<b1. These conditions are mutually exclusive and correspond to pass mode coding b2<a1, the unique V0 form a vertical mode coding a1=b1 which are, at this point, fully defined together with a1>b1 and a1<b1 which indicate, respectively either the VR and VL forms of vertical mode coding or horizontal mode coding. The valid one of these four results is signalled to the control sequencer 28 on bus 204 and to feature generator 206 on the extension 205 to bus 204.

If VL or VR, the control sequencer initiates the second step using selective gating circuits 208, 210 connected respectively to registers 20,22 24; and 18 20 24 (a1, a2, b1; a0, a1, b1) and both feeding a subtraction circuit 212 outputting to a decoder 214 and to a counter register 216. If VL, meaning a1 is to the left of b1 or b1>a1, register 24 is gated via gate 208 and register 20 is gated via gate 210 and if VR, meaning a1 is to the right of b1 or a1>b1, register 20 is gated via gate 208 and register 24 is gated via gate 210, in either case producing |a1−b1|, the sign already being established by comparator 202. The decoder signals either |a1−b1|>3 or |a1−b1|≦ both to feature generator 206 and to the sequence controller 28. The count is latched into the count register 216. If |a1−b1|>3, the count register is reset since |a1−b1|>3 stipulates horizontal mode coding and the actual value |a1−b1| is not required. If |a1−b1|≦3, the two least significant bits in the count register 216 are required to augment either VR or VL to define the feature.

However, since, in the given example, there are only four results which matter, the embodiment handles the two least significant bits in the subtractor decoder which has four outputs (HM, V3, V2 and V1) defined as follows:

HM=OR Sbi, i≧2
V3=HM.Sb1.sb0
V2=HM.Sb1.Sb0
V1=HM.Sb1.Sb0 where Sbj is the jth bit of the subtraction result, Sb0 being the least significant bit, the count register being reset.

If |a1−b1|>3, two further steps are required to obtain the numerical results (a1−a0) and (a2−a1), both, by definition positive. The control sequencer 28 causes, in the first step, gate 208 to gate register 20 to the subtractor and gate 210 to gate register 18 similarly while, in the second following step, gate 208 gates register 22 and gate 210 gates register 20.

Thus at the end of the second step, feature generator hold PM, VR3, VR2, VR1, V0, VL1, VL2, VL3 or HM and all of them are fully defined except for HM which need the numerical values to be generated in the next two steps. The contents of feature generator 206 are gated into feature register 218 when available at the end of the first or the second step for transmission to buffer store 32 but HM needs to be held as the feature for the final two steps. Thus feature decoder 220, is coupled to the feature register 218 and supplies a feed back to feature generator 206 locking the feature loop into HM for the two final steps which is a convenient way of preventing the subtractor decoder 214 from disturbing the feature setting should, for example, (a1−a0) or (a2−a1) be three or less. There are other ways of achieving the same end but these tend to require more control lines leaving the control sequencer 28.

As to the control lines to and from the sequencer, in addition to the inputs from comparators 200 and 202 on bus 204 and from subtractor decoder 214 on bus 215, control sequencer 28 receives, when distributed in independent sections, at this stage, constants ready on lines 96 and 97, FIFO ready on line 224, and various optional extra data requiring specialist code outputs quite distinct from PM, VM and HM such as End of Line. Such extra data can be handled in two way, neither of which is of particular importance to present matters, it can be passed to the feature generator directly, as on line 226, with the control sequencer being alerted on line 215, so as to perform a "NO STEP" cycle or it can be passed directly to the control sequencer, as on line 227, in response to which the feature generator is forced in a one step cycle. The output control lines from the control sequencer are not specifically referenced although the main ones are shown and drive at least gates 208, 210; the feature generator 206; the count register 216; the feature register 220; the FIFO store 32 (a write operation in this case) and the output in terms of a feature ready signal.

There is a point to be noted in that while conceptually all control lines pass to and leave from the control sequencer, the physical arrangement may be different, although equivalent, see for example the FIFO lines 224 228 and 230, to accommodate actual connector restrictions. If a logic section needs more theoretical inputs then it provides theoretical outputs, the use of just an output 228 and an AND gate will substitute since FIFO NEEDED (228). FIFO READY (224)=FIFO WRITE (230). Thus the shown FIFO arrangement of FIG. 7 is exactly equivalent to those of FIGS. 2 and 4. Equally, the shown arrangement of externally coupled logic sections forming control sequencer 28 is exactly equivalent to a single internally coupled but larger logic section.

OUTPUT LOGIC (FIG. 9)

Little needs to be said about the output logic save that it comprises, essentially, physical output drivers, a byte assembler and two look up tables, one providing the actual codes representing PM, VL3, VL2, VL1, VL0, VR1, VR2, VR3 and HM and the other providing coded numerical outputs for the values (a1−a0) and (a2−a1) to be appended to the coded output for HM. A modified Huffman code is preferred for this latter translation and a sample of the code is set forth in the following table:

| White Run Length | Code Word | Black Run Length | Code Word |
|---|---|---|---|
| 0 | 00110101 | 0 | 0000110111 |
| 1 | 000111 | 1 | 010 |
| 2 | 0111 | 2 | 11 |
| 3 | 1000 | 3 | 10 |
| 4 | 1011 | 4 | 011 |
| 5 | 1100 | 5 | 0011 |
| 6 | 1110 | 6 | 0010 |
| 7 | 1111 | 7 | 00011 |
| 8 | 10011 | 8 | 000101 |
| 9 | 10100 | 9 | 000100 |
| 10 | 00111 | 10 | 0000100 |
| 11 | 01000 | 11 | 0000101 |
| 12 | 001000 | 12 | 0000111 |
| 13 | 000011 | 13 | 00000100 |
| 14 | 110100 | 14 | 00000111 |
| 15 | 110101 | 15 | 000011000 |
| 16 | 101010 | 16 | 0000010111 |
| 17 | 101011 | 17 | 0000011000 |
| 18 | 0100111 | 18 | 0000001000 |
| 19 | 0001100 | 19 | 00001100111 |
| 20 | 0001000 | 20 | 00001101000 |
| 21 | 0010111 | 21 | 00001101100 |
| 22 | 0000011 | 22 | 00000110111 |
| 23 | 0000100 | 23 | 00000101000 |
| 24 | 0101000 | 24 | 00000010111 |
| 25 | 0101011 | 25 | 00000011000 |
| 26 | 0010011 | 26 | 000011001010 |
| 27 | 0100100 | 27 | 000011001011 |
| 28 | 0011000 | 28 | 000011001100 |
| 29 | 00000010 | 29 | 000011001101 |
| 30 | 00000011 | 30 | 000001101000 |
| 31 | 00011010 | 31 | 000001101001 |
| 32 | 00011011 | 32 | 000001101010 |
| 33 | 00010010 | 33 | 000001101011 |
| 34 | 00010011 | 34 | 000011010010 |
| 35 | 00010100 | 35 | 000011010011 |
| 36 | 00010101 | 36 | 000011010100 |
| 37 | 00010110 | 37 | 000011010101 |
| 38 | 00010111 | 38 | 000011010110 |
| 39 | 00101000 | 39 | 000011010111 |
| 40 | 00101001 | 40 | 000001101100 |
| 41 | 00101010 | 41 | 000001101101 |
| 42 | 00101011 | 42 | 000011011010 |

| White Run Length | Code Word | Black Run Length | Code Word |
| --- | --- | --- | --- |
| 43 | 00101100 | 43 | 000011011011 |
| 44 | 00101101 | 44 | 000001010100 |
| 45 | 00000100 | 45 | 000001010101 |
| 46 | 00000101 | 46 | 000001010110 |
| 47 | 00001010 | 47 | 000001010111 |
| 48 | 00001011 | 48 | 000001100100 |
| 49 | 01010010 | 49 | 000001100101 |
| 50 | 01010011 | 50 | 000001010010 |
| 51 | 01010100 | 51 | 000001010011 |
| 52 | 01010101 | 52 | 000000100100 |
| 53 | 00100100 | 53 | 000000110111 |
| 54 | 00100101 | 54 | 000000111000 |
| 55 | 01011000 | 55 | 000000100011 |
| 56 | 01011001 | 56 | 000000010100 |
| 57 | 01011010 | 57 | 00000101100 |
| 58 | 01011011 | 58 | 00000101100 |
| 59 | 01001010 | 59 | 000000101011 |
| 60 | 01001011 | 60 | 000000101100 |
| 61 | 00110010 | 61 | 000001011010 |
| 62 | 00110011 | 62 | 000001100110 |
| 63 | 00110100 | 63 | 000001100111 |
| 64 | 11011 | 64 | 0000001111 |
| 128 | 10010 | 128 | 000011001000 |
| 192 | 010111 | 192 | 000011001001 |
| 256 | 0110111 | 256 | 000001011011 |
| 320 | 00110110 | 320 | 000000110011 |
| 384 | 00110111 | 384 | 000000110100 |
| 448 | 01100100 | 448 | 000000110101 |
| 512 | 01100101 | 512 | 0000001101100 |
| 576 | 01101000 | 576 | 0000001101101 |
| 640 | 01100111 | 640 | 0000001001010 |
| 704 | 011001100 | 704 | 0000001001011 |
| 768 | 011001101 | 768 | 0000001001100 |
| 832 | 011010010 | 832 | 0000001001101 |
| 896 | 011010011 | 896 | 0000001110010 |
| 960 | 011010100 | 960 | 0000001110011 |
| 1024 | 011010101 | 1024 | 0000001110100 |
| 1088 | 011010110 | 1088 | 0000001110101 |
| 1152 | 011010111 | 1152 | 0000001110110 |
| 1216 | 011011000 | 1216 | 0000001110111 |
| 1280 | 011011001 | 1280 | 0000001010010 |
| 1344 | 011011010 | 1344 | 0000001010011 |
| 1408 | 011011011 | 1408 | 0000001010100 |
| 1472 | 010011000 | 1472 | 0000001010101 |
| 1536 | 010011001 | 1536 | 0000001011010 |
| 1600 | 010011010 | 1600 | 0000001011011 |
| 1664 | 011000 | 1664 | 0000001100100 |
| 1728 | 010011011 | 1728 | 0000001100101 |
| EOL | 000000000001 | EOL | 000000000001 |

SUMMARY

Thus there has been disclosed an encoder which has an input section loading the a and b registers and an output section generating multimode code elements derived from the contents of the a and b registers, with feed back at various levels, register to register, register to control and output to control which will encode a binary matrix presented line by line in run length encoded form making a single pass through the input line code elements.

The control sequencer, if based on sequential feed back logic, program logic arrays or plural control look-up tables need not and generally will not perform tests sequentially but, effectively in parallel, since, in each case, entry to a sequence is made if the appropriate entry point is signalled so that a multiple "IF→ELSE" sequence is automatically resolved in a single pass when depending on input states rather than fed back states.

What is claimed is:

1. A system for compressing image data comprising:
   means for storing a reference line of the image in the form of successive run length code words,
   means for storing a to-be-coded current line of the image in the form of successive run length code words,
   a plurality of transition point registers
   an operating point register,
   first logic means, responsive to the contents of said transition point and operating point registers, defining an appropriate one of a finite number of relationship states relative to the contents of said registers,
   encoding means responsive to the first logic means for producing a different code word for each different one of said states such codeword being representative of a variable size segment of said to-be-coded line of image data,
   second logic means uniquely responsive to each of said states for establishing a corresponding specific interconnection among said operating point register, said transition registers, and said line data storing means for updating the contents of said registers for encoding of an immediately succeeding segment of said to-be-encoded line.

2. A system as set forth in claim 1 in which said second logic means includes:
   combinatorial logic;
   means for selectively multiplexing the outputs of said storing means and the contexts of said registers to said combinatorial logic; and
   means for selectively demultiplexing the outputs of said combinatorial logic to said registers.

3. A system as set forth in claim 2 in which
   each said storing means is a first-in first-out (FIFO) buffer store, said second logic means selectively accessing or not accessing each said buffer store,
   said first logic means including means for selectively generating the differences between the contents of different pairs of said registers,
   the system further including means for temporarily buffering the contents of said transition point registers.

4. A system as set forth in claim 1 wherein said line storing means each comprise a respective FIFO buffer;
   said transition point registers comprise first and second current line transition point registers and first and second reference line transition point registers;
   said second logic means including
   a current line adder;
   first current line gating logic having its input connected to the output of said current line buffer and its output connected to said current line adder;
   second current line gating logic having its input connected to the outputs of said operating point register and said first and second current line transition point registers and to the output of said second reference line transition point register and its output connected to said current line adder;
   the output of said current line adder being connected, in parallel to the inputs of said operating point register and said first and second current line transition point registers;
   a reference line adder;
   first reference line gating logic having its input connected to the output of said reference line buffer and its output connected to said reference line adder;
   second reference line gating logic having its input connected to the outputs of said first and second reference line transition point registers and its output connected to said reference line adder;

5. A system as set forth in claim 4 further including a first reference line buffer register having its input connected to said first reference line transition point register;

a second reference line buffer register having input connected to the output of said first reference line buffer and its output connected to the input of said second reference line gating logic;

a first current line buffer register having its input connected to the output of said first current line transition point register; and a second current line buffer register having its input connected to the output of said second current line transition point register;

a first comparator having its inputs connected to the outputs of said first current line buffer register and of said second reference line buffer register and providing significant output when the contents of the latter register exceed the contents of the former register;

a second comparator having its inputs connected to the outputs of said second reference line transition point register and of said first current line transition point register and providing a significant output when the contents of the respective registers are equal;

a third comparator having its inputs connected to the outputs of said first reference line transition point register and of said second current line buffer register and providing a significant output when the contents of the former register are greater than the contents of the latter register; and a fourth comparator having its input connected to the outputs of said second reference line transition point register and of said second current line buffer register and providing a significant output when the contents of the latter register are smaller than the contents of the former register;

said first, second, third and fourth comparators forming part of said second logic means, the significant outputs thereof, in part, controlling the operation of said second logic means.

6. A system as set forth in claim 5 further including a fifth comparator having its input connected to the outputs of said second reference line transition point register and of said first current line transition point register and providing a significant output when the contents of the latter register exceed the contents of the former register;

a sixth comparator having its inputs connected to the outputs of said first current line transition point register and of said first reference line transition point register and providing three discrete output indicating respectively the equality state and each of the two inequality states of the contents of said registers;

said fifth and sixth comparators forming part of said first logic means, said first logic means further including a subtractor;

first subtractor gating logic having its input connected to the outputs of said first and second current line transition point registers and of said first reference line transition point register and its output connected to one input of said subtractor;

second subtractor gating logic having its input connected to the outputs of said operating point register, said first current line transition point register and said first reference line transition point register and its output connected to the other input of said subtractor;

a count register;

a subtractor decoder;

the output of said subtractor being connected in parallel to the inputs of s said subtractor decoder providing discrete outputs for each difference up to n and for the difference being greater than n;

a feature generator having its input connected to the outputs of said fifth and sixth comparators and of said subtractor decoder;

a feature register;

a feature and count buffer;

said feature register being connected between the output of said feature generator and the input of said feature buffer;

the output of said count register being connected to the input of said feature buffer;

a feature decoder having its input connected to the output of said feature register and its output connected to the input of said feature generator; and an output generator having its input connected to said feature buffer and arranged to generate output code signals particular to the contents of said feature and count buffer.

7. A system as set forth in claim 6 further including a sequence controller connected to receive inputs from said line and feature buffers, said comparators, said subtractor decoder as well as external control signals, if any, and connected to provide control signals to said line and feature buffers, said operating point register, said transition point registers, said buffer registers said gating logic, said feature generator, said feature register, and said count register, said sequence controller being arranged to control the operation of the various components of the the encoder so that (a) if said fifth comparator provides a significant output, a pass mode output is generated (b) if said subtractor decoder generates a greater than n output, a horizontal mode output is generated (c) otherwise a vertical mode output is generated (d) if a pass mode output is generated, the contents of said operating point register are replaced by the contents of said second reference line transition point register and the contents of said first and second reference line transition point registers are replaced by the contents of said second reference line transition point register increased by the values of the next and the next two run length code elements from said reference line buffer and the next mode is generated (e) if a horizontal mode output is generated, the contents of said operating point register and said first and second current line transition point registers are replaced by the contents of said second current line transition point register, respectively unaltered and increased by the values of the next and the next two run length code elements from said current line buffer, and the contents of said first and second reference line transition point registers are replaced by the contents of said second reference line transition point register incremented respectively by the values of an odd and an even number of successive run length code elements from said reference line buffer until said third comparator provides a significant output and the next mode is generated (f) if a vertical mode output is generated, and said first comparator provides a significant output, the contents of said first and second reference line transition point registers are replaced by the contents of said second and first reference line buffer registers respectively, and if not, by the contents of said second reference line transition point register respectively unaltered and incremented by the value of the next run length code element from said reference line buffer if said second comparator is not producing a significant ouput, and by such values respectively incremented by a further two successive run length code elements, if it is, the contents of said operating point register and said first and second current line transition point registers being replaced, respectively, by the contents of said first and second current line transition point registers and this latter value incremented by the value of the next run length code element from said current line buffer, and the next mode is generated (g) said feature buffer being loaded with a pass mode indication alone if said fifth comparator provides a significant output and with a particular vertical mode indication alone if said sixth comparator provides an output signifying equality, otherwise the contents of said first reference line transition point register and said first current line transition point register are gated to said subtractor so as to produce a positive resultant as determined by the outputs of said sixth comparator and, unless said subtractor decoder output signifies greater than n, a corresponding vertical mode indication alone is loaded into said feature buffer register, otherwise the contents of said first current line transition point register and said operative point register, followed by the contents of the second and first current line transition point registers are gated to said subtractor, the results, guaranteed positive, being loaded into said feature buffer successively via said count register, said feature decoder locking said feature generator into horizontal mode significance, reloading of said operating point and transition point registers being restarted as loading of said feature buffer is completed.

* * * * *